US007002762B2

(12) United States Patent
Mayergoyz et al.

(10) Patent No.: US 7,002,762 B2
(45) Date of Patent: Feb. 21, 2006

(54) METHOD FOR INTERSYMBOL INTERFERENCE REMOVAL IN DATA RECOVERY

(75) Inventors: Isaak D. Mayergoyz, Rockville, MD (US); Chun Tse, Beltsville, MD (US); Charles S. Krafft, Owings Mills, MD (US)

(73) Assignees: University of Maryland, College Park, MD (US); National Security Agency, Ford Meade, MD (US)

( * ) Notice: Subject to any disclaimer, the term of this patent is extended or adjusted under 35 U.S.C. 154(b) by 109 days.

(21) Appl. No.: 10/776,214

(22) Filed: Feb. 12, 2004

(65) Prior Publication Data

US 2005/0180039 A1 Aug. 18, 2005

(51) Int. Cl.
*G11B 5/09* (2006.01)

(52) U.S. Cl. .......................... 360/46; 360/66; 360/50; 360/42; 360/113; 360/123; 360/51; 360/78.08

(58) Field of Classification Search ............ 360/40–42, 360/51, 48, 50, 78.08, 45; 341/53, 59; 714/752; 369/59.1
See application file for complete search history.

(56) References Cited

U.S. PATENT DOCUMENTS 4,063,281 A * 12/1977 Kornreich et al. .......... 382/280
5,818,806 A * 10/1998 Wong et al. ............. 369/53.33
5,841,601 A * 11/1998 Fisher ........................ 360/48

OTHER PUBLICATIONS

C. Tse, et al., "High-speed massive imaging of hard disk data by using the spin-stand imaging technique," J. Appl. Psys., vol. 93, No. 10, pp. 6578-6580, May 15, 2003.

I.D. Mayergoyz, et al., "Scaling of head response function in the spin-stand imaging technique," J. Appl. Phys., vol. 93, No. 10, pp. 6581-6583, May 15, 2003.

I.D. Mayergoyz, et al., "Extraction of the response function of GMR head for spin-stand imaging," IEEE. Trans. Magn., vol. 38, No. 5, pp. 2453-2455, Sep. 5, 2002.

C. Tse, et al., "Spatial and vectorial characterization of thermal relaxation using the spin-stand imaging technique." J. Appl. Psys., vol. 91, No. 10, pp. 8846-8848, May 15, 2002.

(Continued)

*Primary Examiner*—David Hudspeth
*Assistant Examiner*—Dismery Mercedes
(74) *Attorney, Agent, or Firm*—Rosenberg, Klein & Lee

(57) ABSTRACT

In recovering data originally written on a carrier of magnetic media after a catastrophic failure, data may be read without prior knowledge of the write channel by which the data was originally written and in the presence of intersymbol interference of the readback signal. This is accomplished by forming an image of the spatial response function of the magnetoresistive transducer used to recover the data and by forming an image of the raw data read from the carrier of magnetic media by the magnetoresistive transducer for which the response function has been characterized. An image of the distribution of virtual magnetic charge on the carrier of magnetic media is obtained through deconvolution of the image of the response function of the magnetoresistive transducer and the raw readback signal. The readback signal corresponding to the data originally written on the carrier of magnetic media is then recovered by spatial differentiation of the image of virtual magnetic charge. Further improvement in image quality of the resulting image is accomplished through a noise reduction technique such as by the application of an arctangent function to the data prior to differentiation.

21 Claims, 11 Drawing Sheets

OTHER PUBLICATIONS

I.D. Mayergoyz, et al., "Spin-stand imaging of overwritten data and its comparison with magnetic force microscopy," J. Appl. Phys., vol. 89, No. 11, pp. 6772-6774, Jun. 1, 2001.

I.D. Mayergoyz, et al., "Spin-stand imaging of transverse magnetization profiles of recorded tracks," J. Appl. Phys.., vol. 89, No. 11, pp. 6775-6777, Jun. 1, 2001.

C. Tse, et al., "Spin-stand study of data-dependent thermal relaxations of magnetization patterns," J. Materials Processing & Manufacturing Science, vol. 9, pp. 82-89, Oct. 2000.

I. D. Mayergoyz, et al., "Magnetic imaging on a spin-stand," J. Appl. Phys., vol. 87, No. 9, pp. 6824-6826, May 1, 2000.

I.A. Beardsley, "Reconstruction of the Magenetization in a Thin Film by a Combination of Lorentz Microscopy and External Field Measurements," IEEE Trans. Magn., vol. 25, No. 1, pp. 671-677, Jan. 1989.

I.D. Mayergoyz, et al., "Magnetization Image Reconstruction from Magnetic Force Scanning Microscopy Images," J. Appl. Phys., vol. 73, No. 10, pp., 5799-5801, May 15, 1993.

* cited by examiner

METHOD FOR INTERSYMBOL INTERFERENCE REMOVAL IN DATA RECOVERY

STATEMENT REGARDING FEDERALLY SPONSORED RESEARCH OR DEVELOPMENT

The development of the invention described herein was funded by the U.S. Department of Defense through Contract MDA-904-01-C-0904. The U.S. Government has certain rights in this invention.

BACKGROUND OF THE INVENTION

1. Field of the Invention

The subject invention is directed to recovering data as recorded on magnetic media without prior knowledge of the write channel circuitry utilized in the recording thereof. More specifically, the present invention relies on the characterization of the magnetoresistive transducer operating at the interface of the read channel circuitry and the magnetic media. The subject method effectively removes intersymbol interference that, after appropriate decoding, will lead to the recovery of otherwise unreadable data.

2. Description of the Prior Art

In recent years, an increase in commercial activity has been undertaken in the field of hard disk data recovery after a catastrophic failure of the disk drive systems. Currently, the dominant read detection technique in disk drives is the partial response maximum likelihood (PRML). This channel is based on the linearity assumption and prior knowledge of the shape of the ideal readback signal from an isolated transition. By using superposition of properly time-shifted ideal readback signals of isolated transitions, all possible readback signals can be reconstructed and subsequently compared with the equalized readback signal by using maximum likelihood sequence detection criteria. The reconstructed readback signal that best approximates the equalized readback signal is then selected as the most probable binary sequence that was written.

While PRML has been a very successful read channel detection technique that effectively deals with the adverse effects of intersymbol interference (ISI), it is not suited as a read detection method for the recovery of unreadable hard disk data caused by mechanical failures of the drive systems. In order to comprehend why this is the case, it is first necessary to understand the usual conditions of mechanical disk drive failures. Mechanical failures of hard disk drives are often characterized by a head crashing onto the disk, thus damaging both itself and the media. In this scenario, the drive data will be unreadable even when the damaged head is replaced by a new one. This is because the new head will suffer from the same damage once it passes the scratched region on the media, which will surely come to pass when the head actuator moves rapidly in and out across the surface of the disk platter during the initial booting of the hard drive. In the case of a head crash, no recovery software can come to the rescue. Moreover, the use of such software often exacerbates the damage and makes further recovery even more difficult.

Another example of a mechanical failure of the drive is that of a spindle motor which ceases to spin for any of a variety of reasons. It should be clear that no software can be used to recover the data when the spindle motor has failed in that there would be no relative motion between the magnetoresistive head and the magnetically polarized regions on the surface of the disk. Such relative motion is necessary, of course, as it is the change in magnetic flux at the read head, as caused by the relative motion of the magnetically polarized regions on the rotating disk and the read head, that produces a voltage signal in the read channel, which is subsequently processed to produce, ideally, the originally written data.

Under the above failure conditions, the only hope of recovering the recorded data is to open the damaged drive and move the disk platter to another device capable of performing hard disk reading functions. In the new reading environment, however, a read channel other than PRML is required. This is because PRML will only work if the proper time shifts of superimposed ideal transitions are known on the basis of a priori information of the write channel characteristics. This information, however, is often unavailable in data recovery practices when the data must be recovered from numerous disk drives of various, even unknown, origins. Indeed, prior knowledge of the write channel that is necessary for the PRML read channel to function correctly, such as bit cell period, is not available in this foreign read setting. Hence, in order for the hard disk data to be recovered, a new read channel must be devised that is independent of the write channel by which the data were recorded.

Intersymbol interference is one of the main limiting factors in the recording of data on magnetic media as the increase of linear data density and the decrease of bit error rate of hard drives continue to be the thrust of hard disk drive development. As future hard drives entail a much higher track density, it can be expected that ISI will become an issue in the cross-track direction as well as the along-track direction. That is to say, a two-dimensional interference problem that consists of ISI in the along-track direction and ITI (intertrack interference) in the radial direction will occur. However, PRML does not have an easy generalization to the two-dimensional case and the need for a technique to combat two-dimensional ISI presents itself. Such a system would be instrumental for the retrieval of erased or overwritten data that are usually preserved at the edges of erased tracks. While current hard disks have blank regions of zero magnetization (guard bands) between tracks to minimize ITI during the readback process, there are no guard bands in the case of overwritten data. In this case, the new data (overwrite data) are written directly, with a small radial misregistration, on top of the old data (overwritten data), thus creating an across-track ISI between the new and old data as well as an along-track ISI between the adjacent transitions of the old data. A system capable of data recovery at the edges of data tracks would have a strong potential for massive data recovery of purposefully overwritten or erased data from disk drives. These recovered overwritten data, regardless of whether the data were altered inadvertently or intentionally, may have significant implications for the intelligence, security, and law enforcement communities.

Existing PRML data recovery techniques are costly in terms of the hardware implementation thereof. First, PRML has two relatively independent parts: partial response (PR) equalization and maximum likelihood (ML) detection. It is essential to note that the PR part does not eliminate ISI, but intentionally introduces and controls it. The purposefully introduced ISI in the PR process is then used by the ML detector for the selection of the most likely data sequence that has been rewritten. Therefore, strictly speaking, PRML does not remove or mitigate ISI, but deals with it. In other words, PR (for equalization) and ML (for detection) have to be implemented together, which adds to the cost and complexity of the hardware implementation.

PRML is based on the superposition of ideal isolated-transition readback signals and subsequent matching of such synthetically constructed signal to the equalized readback signal. Because PRML is based on the linearity assumption, it does not account for hard and soft transition shifts, neither does it account for non-linear transition shift, which is becoming more severe with increasing data density. In order to deal with such shifts, more advanced forms of PRML channels are needed. Their implementation however requires complicated hardware circuitry that involves PR equalizers, ML detectors, digital filters, and sophisticated clock and gain recovery circuits. Because of the complexity of the circuitry involved, PRML consumes a lot of power, making it not suitable for low-power mobile applications. This would limit the use of PRML in cost-effective and low-power hardware implementations in future hard disk drives.

SUMMARY OF THE INVENTION

In light of the foregoing shortcomings of magnetic data recovery systems of the prior art, the method of the present invention provides a new read channel technique that is independent of the corresponding write channel by which the data were recorded and, at the same time, effectively removes ISI. The method is based on a "response function" characterization of giant-magnetoresistive (GMR) heads of hard disk drives. Since the actual signal from a GMR head is a convolution of the head response function and the magnetization patterns (i.e., magnetic charge patterns) of the recorded information, the ISI-free readback signal that represents the actual magnetization patterns can be potentially extracted from the ISI-ridden readback signal through deconvolution.

The method of the subject invention can effectively remove ISI, not simply to deal with it. Therefore, when the readback signal is sufficiently free of ISI after deconvolution, the subject method may utilize a peak detection circuit for data detection, which is a robust and much simpler and less expensive circuit to implement. It also consumes much less power than the PRML technique in all its circuit implementations. Hence, the subject method is suitable for low-power applications such as hard disk drives for notebook computers and hand-held consumer electronic products like camcorders and MP3 music players. Furthermore, the inventive method is based on the comprehensive response function characterization of GMR heads and the fact that the actual readback signal is a convolution of the underlying magnetization patterns and the head response function. Thus, the underlying magnetization patterns can be recovered by using response function characterization of heads and deconvolution of the ISI-ridden readback signal. This technique, therefore, is not sensitive to hard, soft, or non-linear transition shifts and it leads to the actual magnetization patterns in NRZ (or NRZI) forms of data as they are written on the disks.

The method of the present invention further allows a straightforward extension to combat even 2-D ISI. Thus, the head response function characterization of GMR heads can be used for the 2-D imaging of magnetization patterns written on hard drives and, in this way, can be instrumental for the retrieval of erased or overwritten data that are usually preserved at the edges of the tracks.

It is an object of the present invention to provide a method for retrieving a signal corresponding to a distribution of magnetically polarized regions on a carrier of magnetically coated media by means of a magnetoresistive transducer coupled to a read channel circuit in such a way that the retrieved signal is free from ISI. First, the carrier of magnetically coated media, e.g., a magnetically coated hard disk, is installed on a magnetoresistive transducer positioning device, e.g., a spin-stand, for positioning the magnetoresistive read head to a user-selectable location over the media. The positioning device includes drive means for producing a change in magnetic flux about the magnetoresistive transducer (such as by spinning a hard disk while the read head is positioned over the user-selectable location). Next, a spatial image of the response function of the magnetoresistive transducer is constructed by measuring a voltage signal at the output of a read channel coupled to the read head. The response function is measured responsive to a known distribution of magnetically polarized regions disposed on a carrier of magnetically coated media. Once the response function has been characterized, a spatial image of raw read signal data is constructed by measuring the voltage signal at the output of the read channel responsive to an unknown distribution of magnetically polarized regions on a carrier of magnetic media. A spatial image of the distribution of virtual magnetic charge is constructed by spatial deconvolution of the spatial image of the response function of the read head and the spatial image of the raw read signal data. Finally, the intersymbol interference-free readback signal is obtained by spatially differentiating the spatial image of the distribution of virtual magnetic charge.

In another aspect of the present invention, previously written data is retrieved from a magnetically coated disk by means of a magnetoresistive transducer coupled to a read channel circuit, whereby a voltage signal is produced corresponding to a change in magnetic polarity at the magnetoresistive transducer. The magnetically coated disk is installed on magnetoresistive transducer positioning means which includes a spindle motor for rotating the disk relative to a user-selectable location at which the magnetoresistive transducer is positioned. A voltage signal is acquired at the output of the read channel circuit responsive to a known pattern of magnetized regions on the magnetically coated disk in rotation relative to the user-selectable location. The voltage signal is continuously acquired until a spatial image of the response function of the magnetoresistive transducer is formed. Next, a voltage signal is obtained at the output of the read channel circuit responsive to an unknown pattern of magnetized regions on a disk in rotation relative to the user-selectable location and is repeatedly acquired until a spatial image of a raw read signal is formed. By means of a signal processor, a frequency-domain representation of the response function image and a frequency-domain representation of the raw read signal image are calculated and stored as a response function spatial frequency spectrum and a read signal spatial frequency spectrum, respectively. A ratio of the read signal spatial frequency spectrum and the response function spatial frequency spectrum is taken and the resulting image is scaled and transformed into a virtual magnetic charge spatial image. The virtual magnetic charge spatial image is differentiated to produce an image of the readback signal corresponding to the magnetization patterns of the previously written data.

DETAILED DESCRIPTION OF PREFERRED EMBODIMENTS

In an exemplary embodiment of the method of the present invention, the magnetically coated media is extracted from its native operating environment and mounted on a device which can perform magnetically recorded data reading operations under user control. Generally, the magnetic media is installed on a device which is capable of positioning a magnetoresistive transducer over a user-selectable location and drive mechanism for producing a change in magnetic flux about the magnetoresistive transducer at the user-selected location, where the change in magnetic flux corresponds to previously-written, magnetically polarized regions on the magnetically coated media.

Figure 1:
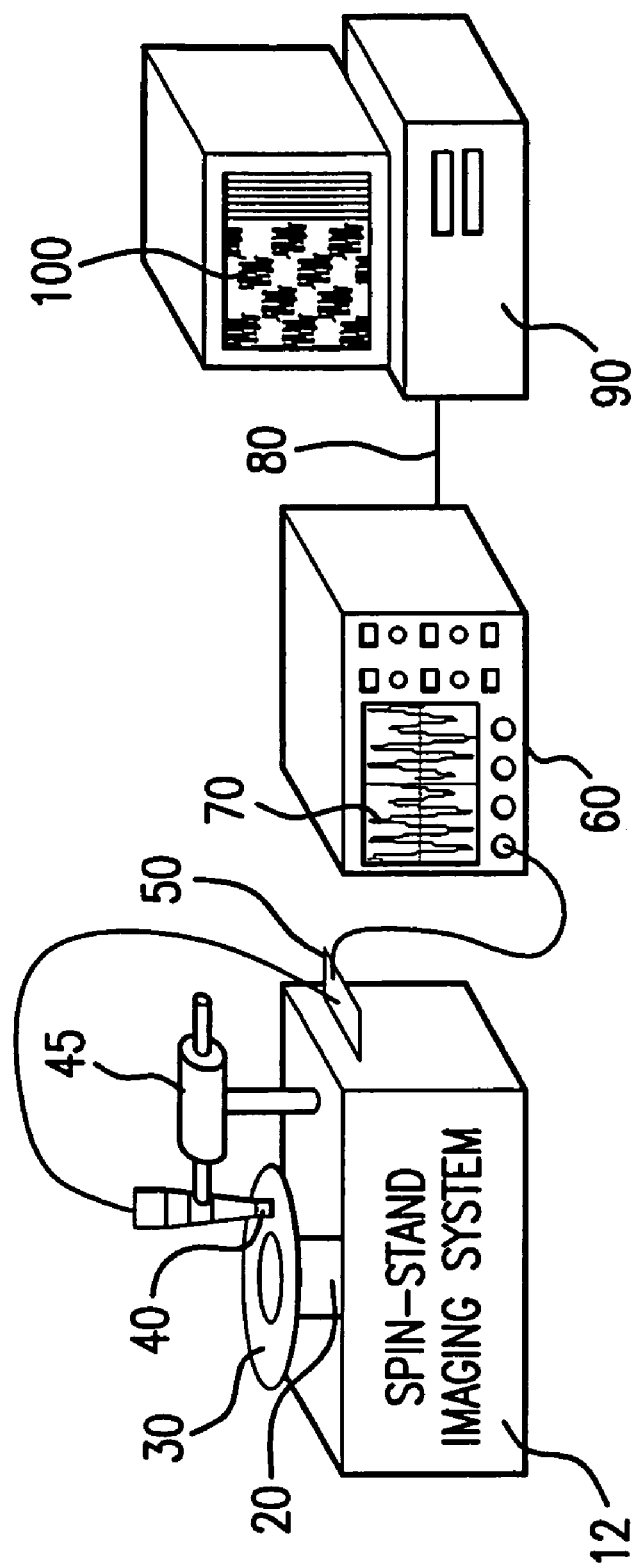
FIG. 1 is an illustration of key components of an exemplary system upon which the method of the present invention may be executed.

For the case of hard disk drives, the carrier of magnetically coated media is a thin, rigid disk, which, in accordance with an exemplary embodiment of the present invention, is mounted on a sophisticated device called a spin-stand. Such a spin-stand, and associated equipment, is illustrated in FIG. 1. As is shown in the Figures, the hard disk 30 is a standard magnetically coated hard disk having a plurality of annular, magnetic tracks formed thereon, as is well-known in the art. The disk 30 is mounted on a spindle motor 20 of the spin-stand system 12.

Magnetoresistive transducer 40 is mechanically coupled to magnetoresistive transducer positioning means 45 of spin-stand imaging system 12. The positioning means 45 is used to position the magnetoresistive transducer 40 to a user-selected location (radius) over hard disk 30. Positioning means 45 may be, but is not limited to, a voice coil actuator, stepper motor, or piezoelectric positioning apparatus. Magnetoresistive transducer positioning means 45 needs only provide fine positioning of magnetic head 40 to within a predefined tolerance (usually on a sub-micron scale).

Magnetic head 40 is mounted to spin-stand system 12 via positioning means 45 to provide the scanning capability of the individual tracks of the disk 30. Spindle 20 is the rotational drive for rotating disk 30 beneath magnetic head 40 so as to provide relative motion between hard disk 30 and magnetic head 40. The relative motion produces a change in magnetic flux from regions of varying magnetic polarity on hard disk 30 about magnetic head 40. As is well-known, the change in magnetic flux is coupled to magnetic head 40 to produce a voltage signal responsive thereto. Thus, whereas the rotational drive system of spin-stand imaging system 12 is an exemplary embodiment, any means to produce a change in magnetic flux about magnetoresistive transducer 40 is within the scope of the present invention.

Magnetic head 40 is in electrical communication with a read channel circuitboard 50 which may include an amplifier and associated circuits to boost the voltage signal produced at the output of magnetic head 40. In the exemplary embodiment illustrated in FIG. 1, the output of read channel circuitboard 50 is electrically coupled to an oscilloscope 60 or other signal display/processing device. Oscilloscope 60 displays readback voltage 70 and is electrically coupled to central processing unit 90 via cable 80. Central processing unit 90 includes a processing chip and storage means, as is well-known in the art. The central processing unit 90 translates the electrical signals generated by the read channel circuitboard 50 into ISI-free data by means of the method of the present invention.

Figure 2:
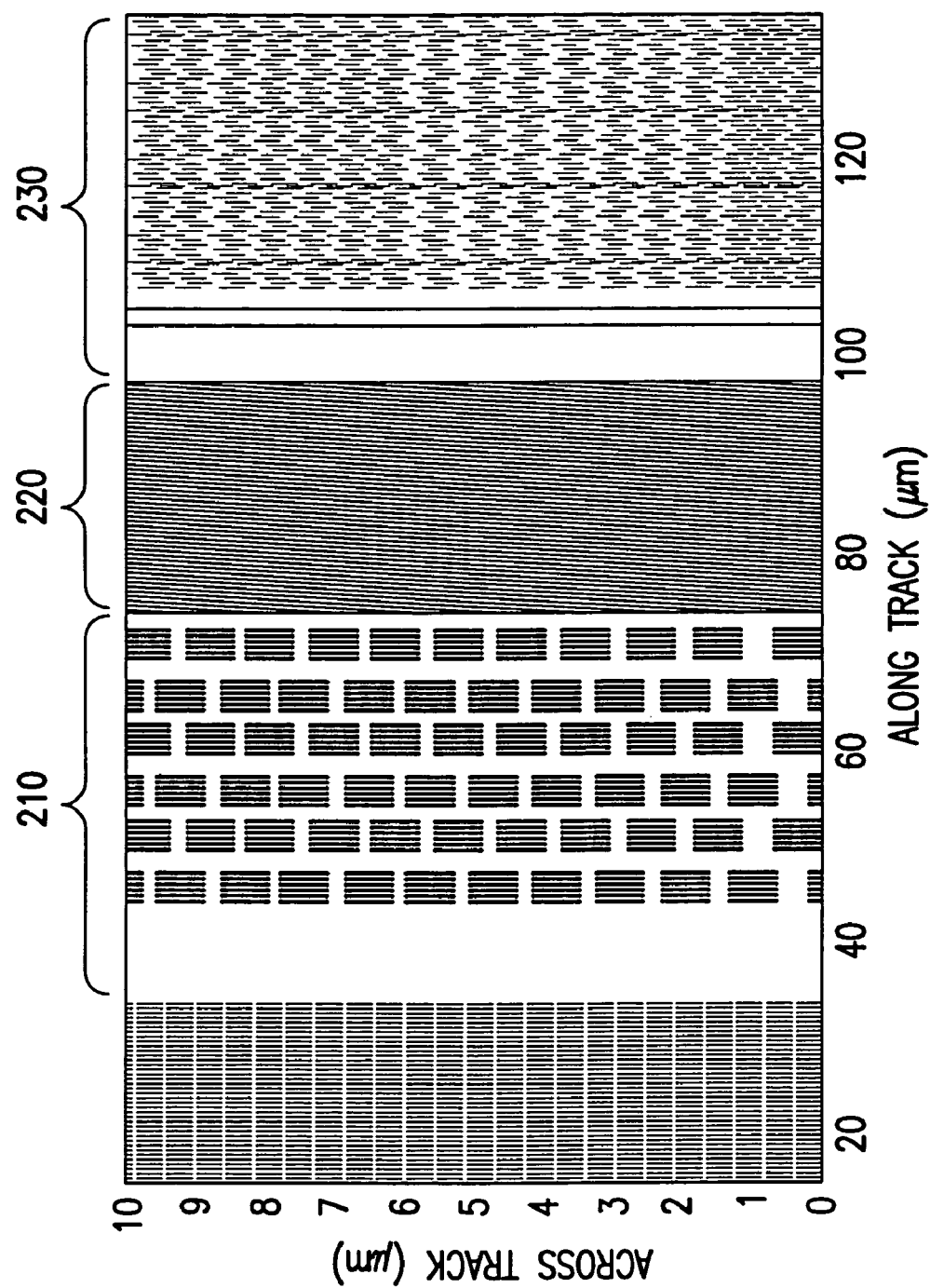
FIG. 2 is an illustration of magnetization patterns of a hard disk with track density of 60,000 tracks per inch.

Spin-stands are routinely used in the magnetic recording industry to characterize heads, media and recording channels. It is therefore an issue of great commercial interest when one can recover the magnetization patterns recorded on hard disks mounted on a spin-stand. Recent advances in technology have allowed the compensation of the eccentricity of the disk and the instability of the trigger signal so that large-scale images of hard disk data may be obtained. A portion of such an image is illustrated in FIG. 2. In the Figure, the dark regions represent changes in magnetization in opposite directions and the unshaded portions represent regions where there is zero magnetization or no change in magnetization at all. The image of FIG. 2, being only a very small portion of a much larger image, shows the servo burst region 210, the gain (preamble) region 220 and a portion of the user-data region 230.

The recent advances in technology of high-speed, massive, spin-stand imaging alone is not adequate, however, for the purpose of data recovery. This is because a spin-stand image of a hard disk represents only a raw image of the ISI-ridden head readback signal. Additional effort must be exerted to remove these ISI-distortions before converting the analog signals into decoded binary data that the operating system can understand. It is this effort of ISI-removal that is an object of the method of the present invention.

Figure 3A:
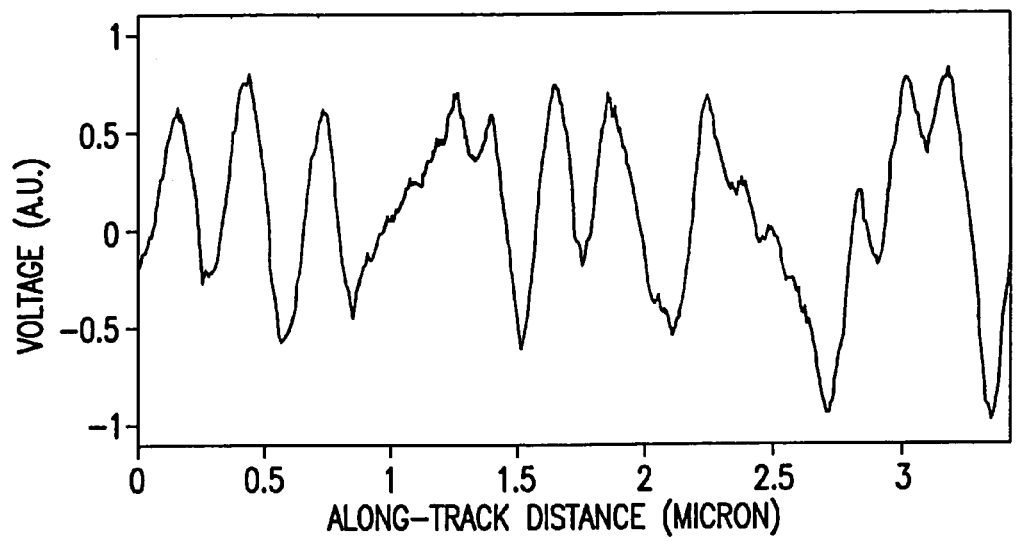
FIGS. 3A and 3B are graphical representations of raw and recovered hard disk magnetization patterns, respectively.
Figure 3B:
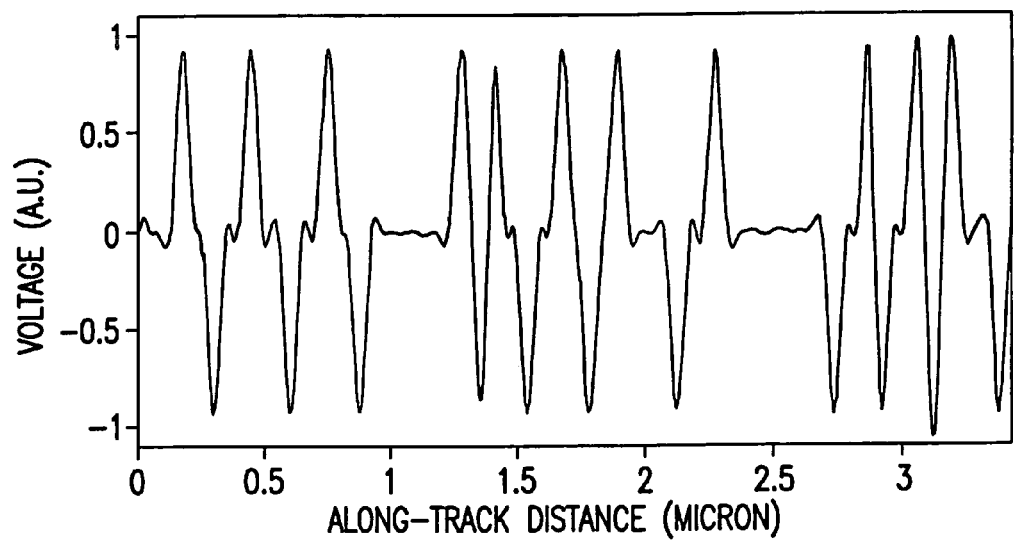

The effectiveness of the subject method is illustrated in FIG. 3A and FIG. 3B. The raw readback signal of FIG. 3A was captured from a hard disk taken from a commercial hard drive with track density of 60,000 tracks per inch and mounted on a spin-stand. The method of the present invention was utilized to remove the ISI from the signals. FIG. 3B portrays the reconstructed, ISI-free signal where, clearly, all the peaks in the raw readback signals have been restored to their correct amplitude and locations after using the subject method.

The present invention is a recovery technique that can remove the distortions in the readback signal of a GMR head caused by ISI. This can be viewed as a process of image reconstruction. The purpose of the reconstruction is to remove the distortion from the raw ISI-ridden readback signal and to retrieve the underlying actual magnetization distributions. Image reconstruction can thus be viewed as the transformation of the physical quantity of interest from that of the temporal signal of the magnetic read head to that of the magnetization patterns on the media. This image reconstruction technique is based on the response function characterization of the GMR element and is described below.

Figure 4:
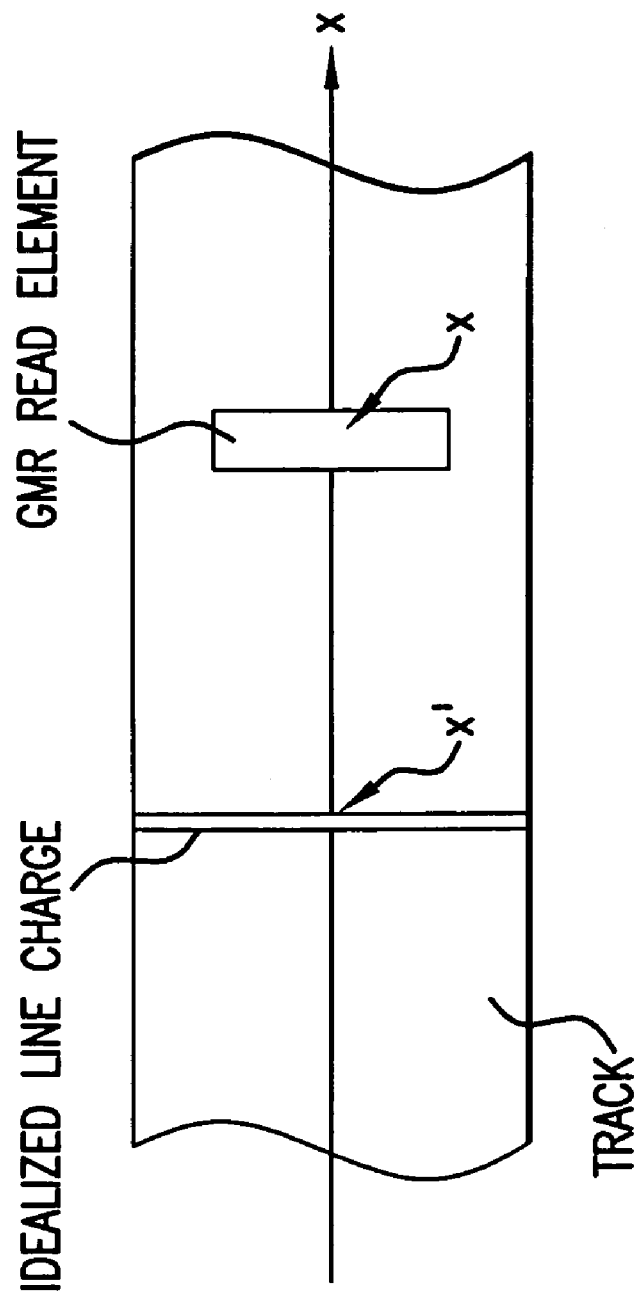
FIG. 4 is an illustration of the topography of the GMR response function acquisition problem for the one-dimensional case.

As illustrated in FIG. 4, the position of the scanning GMR element can be identified by the x coordinate of its center. The recorded magnetization distribution can be characterized by the equivalent distribution of virtual magnetic charges $\sigma_m(x')$. The density of these charges is related to the magnetization by the expression $$\sigma_m(x') = -\mu_0 h \nabla \cdot M = -\mu_0 h \left( \frac{\partial M_x}{\partial x} + \frac{\partial M_y}{\partial y} \right), \quad (1)$$

where h is the thickness of the recording media. It is assumed that the recorded magnetization is uniform over the media thickness and, for this reason, the divergence of M has the meaning of "surface" divergence.

For the purpose of regular data recovery, only the readback signal at the track center is of interest. Therefore, one can further assume that the magnetization is uniform over the width of the track. Under this assumption, equation (1) can be simplified as follows:

$$\sigma_m(x') = -\mu_0 h \nabla \cdot M = -\mu_0 h \frac{\partial M_x}{\partial x} \quad (2)$$

The above one-dimensional treatment of the magnetization is possible only under the condition that the readback signal at the track center is all that is relevant. This is opposed to the case of recovery of overwritten data where the readback signal at the track edges is of importance. This other case by its very nature is a two-dimensional ISI-removal problem, and it requires a 2-D treatment of the magnetization, which will be discussed in paragraphs that follow.

The previously-used term "equivalent distribution of virtual magnetic charges" comes from the fact that this distribution creates the same magnetic field as the actual magnetization distribution. This magnetic field gives rise to the signal collected by the GMR element. This signal can be viewed as the superposition of the signals due to the elementary magnetic charges distributed over the disk surface. This superposition can be written as a convolution integral whose kernel has the physical meaning of the response function of the GMR element. Mathematically, the last assertion can be expressed as follows:

$$S(x) = \int R(x-x') \sigma_m(x') dx' \quad (3)$$

Here, S(x) is the ISI-ridden signal of the GMR element, while R(x-x') can be interpreted as the response function of the GMR element. This function has the physical meaning of the signal induced in the GMR element at position x by the line unit magnetic charge located at position x' (see FIG. 4). It is worth stressing that equation (3) follows from the translational invariance of the readback process. In other words, equation (3) is the weighted superposition of spatially-shifted head response function.

There are two ways to obtain the response function R(x-x'). The first approach is a direct one. In this approach, an isolated and very sharp transition is first written as illustrated in FIG. 4. As a result, a "thin" isolated stripe of magnetic charges is written that can be viewed as an approximation to an ideal line charge. The GMR reading element can then be used to measure the signal as a function of relative position with respect to the recorded "line" magnetic charge. This signal can be interpreted as an approximate version of R(x-x'); the sharper the transition, the more accurate it will be to the actual response function.

Another way to determine the response function is to write a well-defined pattern of magnetization (magnetic charge). For this pattern, the GMR element signal S(x) is measured as a function of x. Then equation (3) can be interpreted as an integral equation in which S(x) and $\sigma_m(x')$ are known, while R(x-x') is unknown. By solving this integral equation, the response function can be determined.

Having determined the response function, equation (3) can be viewed as a convolution integral equation that relates the raw, ISI-ridden signal S(x) to the distribution of virtual, ISI-free magnetic charges $\sigma_m(x')$. This integral equation can be solved by using a one-dimensional Fourier transform:

$$\tilde{f}(k_x) = \int_{-\infty}^{\infty} f(x) e^{-ik_x x} dx \quad (4)$$

The solution can be written as follows:

$$\tilde{\sigma}_m(k_x) = \frac{\tilde{S}(k_x)}{\tilde{R}(k_x)} \quad (5)$$

Having found $\tilde{\sigma}_m$, which is unique to the distribution $M_x$, the Fourier transform of $M_x$ can be determined. By Fourier transforming equation (2), one can derive the following relation for $\tilde{M}_x$:

$$ik_x \tilde{M}_x = -\frac{\tilde{\sigma}_m}{\mu_0 h} \quad (6)$$

which yields:

$$\tilde{M}_x = \frac{i\tilde{\sigma}_m}{\mu_0 h k_x} \quad (7)$$

By performing inverse Fourier transform on equation (7), and by using equation (5), the following explicit formula for the actual distributions of $M_x$ is derived:

$$M_x(x) = FT^{-1} \left[ \frac{i\tilde{S}(k_x)}{\mu_0 h k_x \tilde{R}(k_x)} \right] \quad (8)$$

This reconstructed $M_x(x)$ is decoupled from any distortion caused by ISI.

As mentioned, the above one-dimensional treatment of the magnetization reconstruction is only valid for the recovery of data where the information is concentrated near the center of the track. For the recovery of overwritten data, however, a two-dimensional treatment of the recovery problem is required because the overwritten information, if any, resides at the edges of the track. Track edges usually contain remnant data of previous recordings because exact overwriting will almost never occur due to track misregistration. As the disk platters of hard drives will have even higher coercivity in the future, the fringe field of the write head may not be sufficient to overwrite the data at the track edges, leaving the regions there with old information. With respect to recovering these overwritten data at the track edges, the invented data recovery technique has a natural extension to remove even readback distortions caused by 2-D ISI. The theoretical formulation of this 2-D data recovery, ISI-removal technique is as follows.

The position of the center of the GMR element is identified by the coordinate (x, y). The recorded magnetization distribution can be characterized by the equivalent distribution of virtual magnetic charges $\sigma_m(x', y')$. The density of these charges is related to the magnetization by the expression $$\sigma_m(x', y') = -\mu_0 h \nabla \cdot M = -\mu_0 h \left( \frac{\partial M_x}{\partial x} + \frac{\partial M_y}{\partial y} \right) \quad (9)$$

where, once again, h is the thickness of the recording media and it is assumed that the recorded magnetization is uniform over the media thickness. In the 2-D case, the ISI-ridden readback signal, S(x,y) can be expressed as follows:

$$S(x,y) = \int \int R(x-x', y-y') \sigma_m(x', y') dx' dy' \quad (10)$$

Figure 5A:
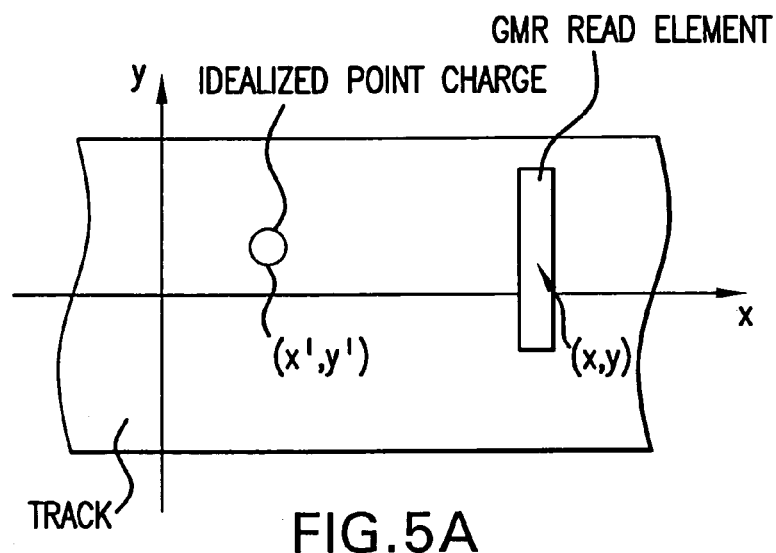
FIG. 5A is a diagram of the topology of the GMR response function acquisition problem for the two-dimensional case.
Figure 5B:
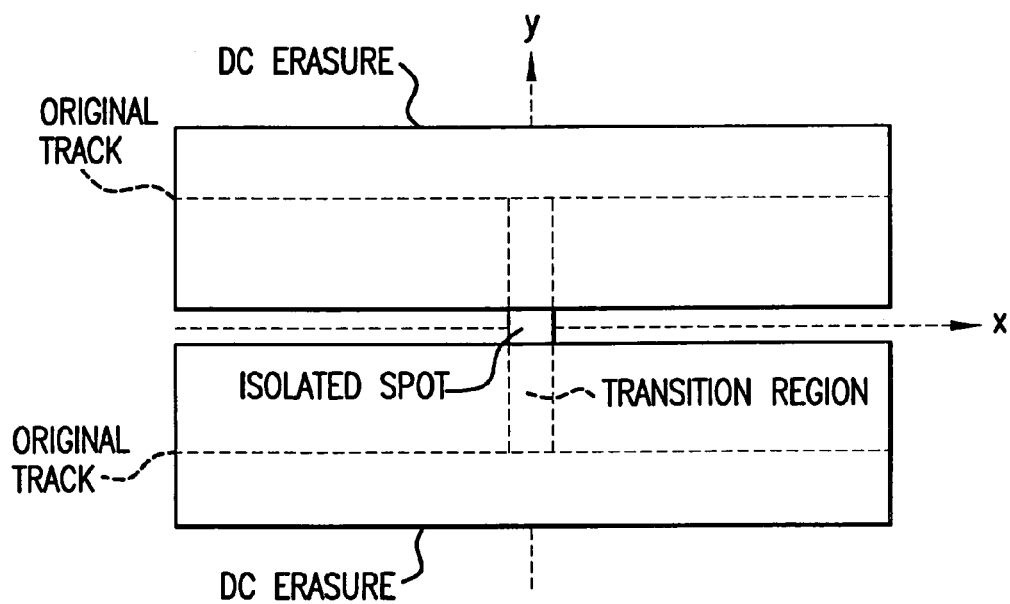
FIG. 5B illustrates a DC-erasure process used to create a localized magnetic charge distribution.
Figure 6A:
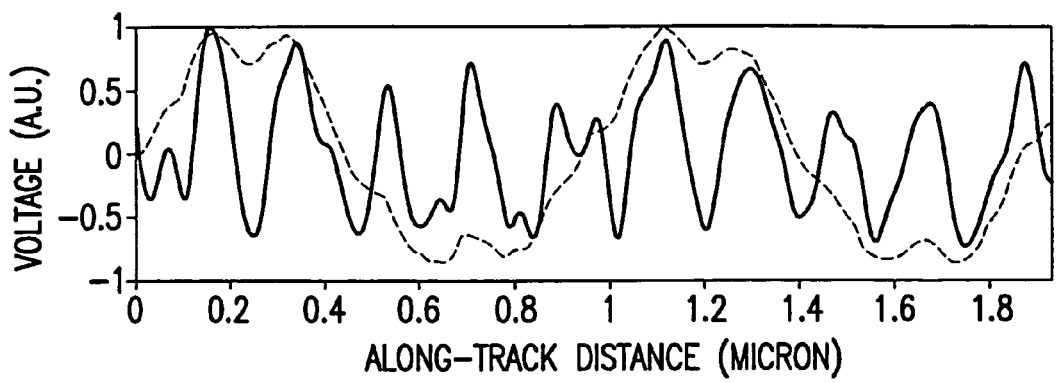
FIGS. 6A–6D illustrate a noise reduction technique for a varying scaling factor of the present invention.
Figure 6B:
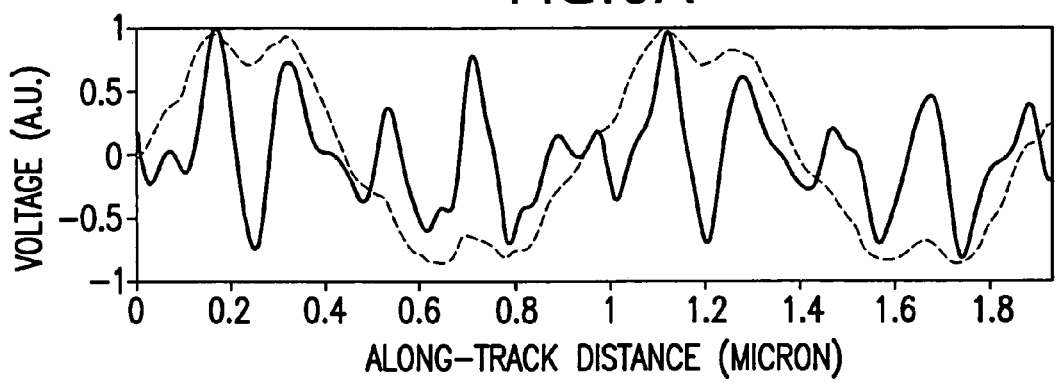
Figure 6C:
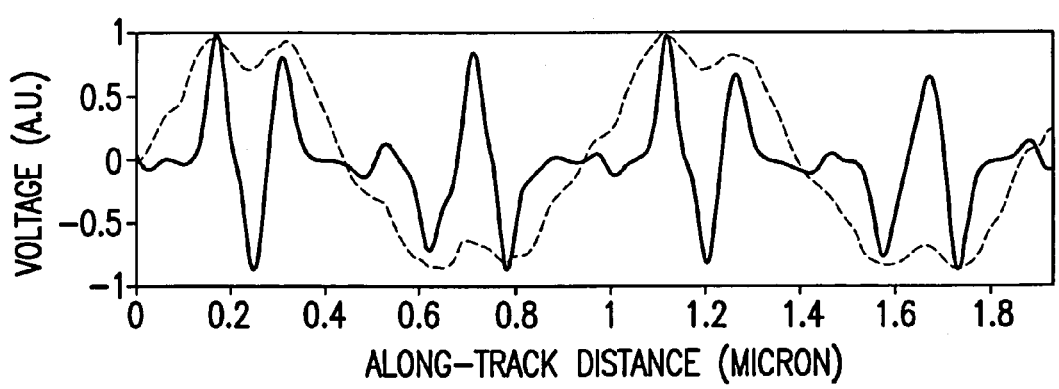
Figure 6D:
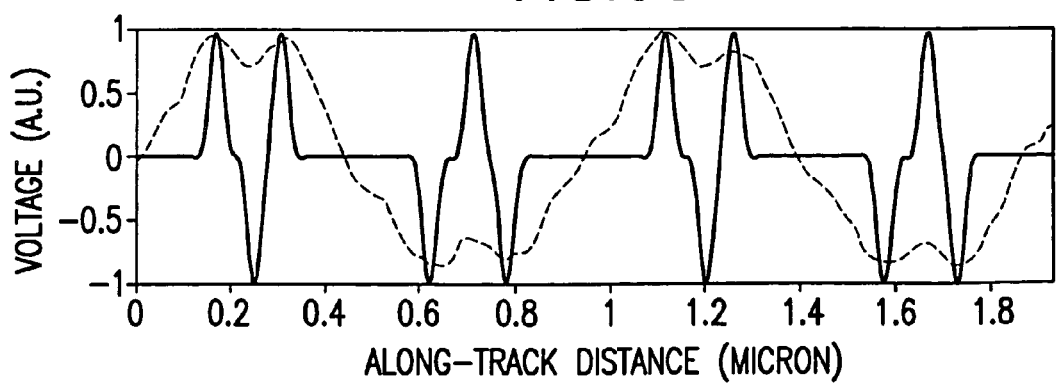
Figure 7A:
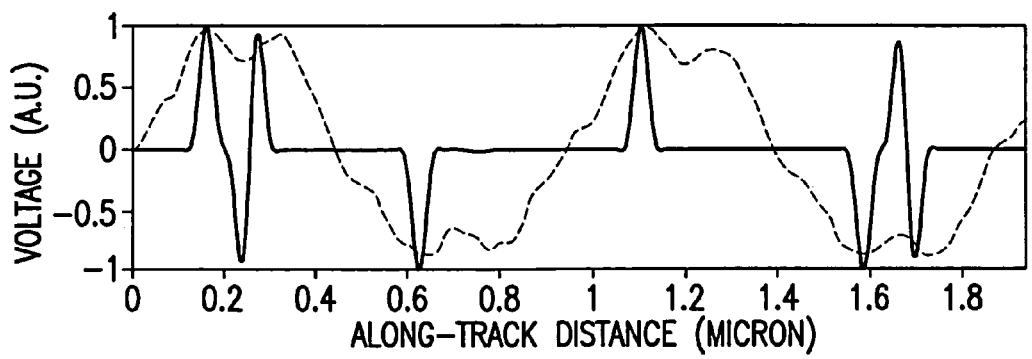
FIGS. 7A–7D graphically portray raw and recovered hard disk tribit patterns for varying magnetoresistive transducer response function scaling factors.
Figure 7B:
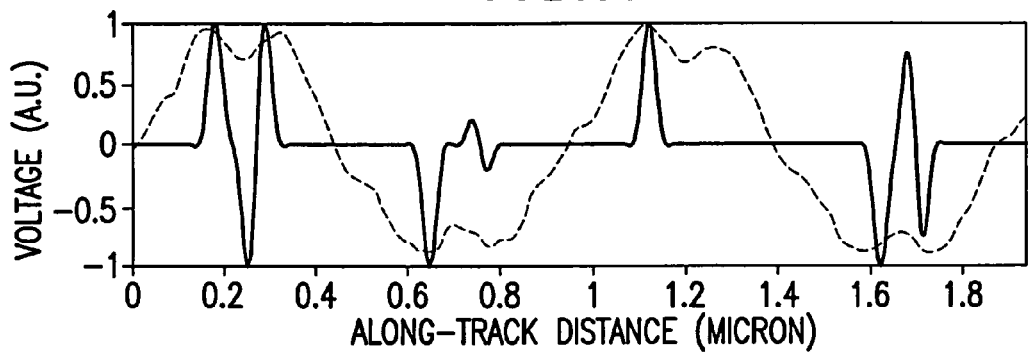
Figure 7C:
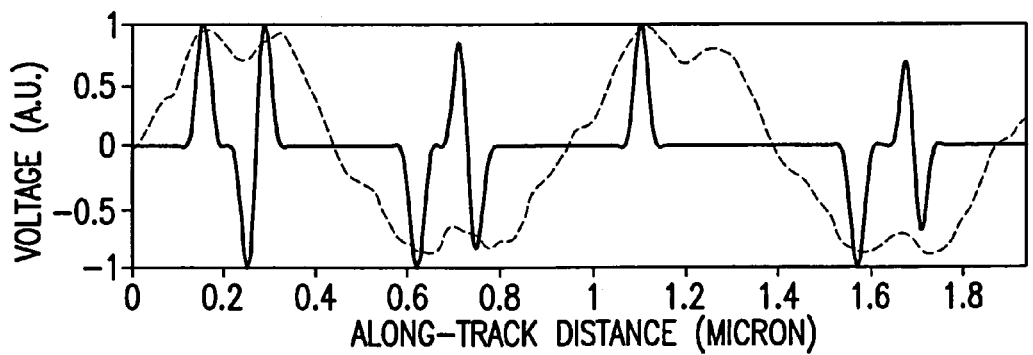
Figure 7D:
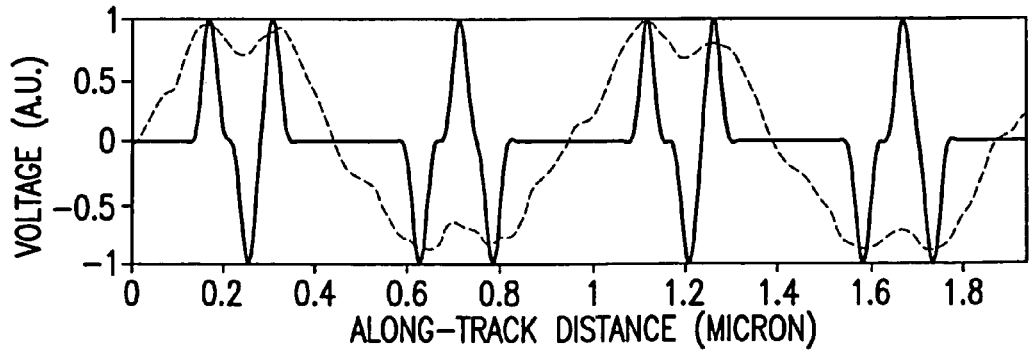

Here, R(x–x', y–y') is the response function of the GMR element. It has the physical meaning of the signal induced in the GMR element at position (x, y) by the point unit magnetic charge located at position (x', y') (see FIG. 5A). There are again two ways to obtain this response function R(x–x', y–y'). In the first approach, an isolated sharp transition is first written. This transition is then trimmed by using dc erasure on both sides of the same track (see FIG. 5B). As a result, a "tiny" isolated spot of magnetic charges is written that can be viewed as an approximation to a point charge. The GMR reading element can now be used to measure the signal as a function of relative position with respect to the recorded "point" magnetic charge. This signal can be interpreted as an approximate version of R(x–x', y–y').

Another way to determine the response function is to write a well-defined pattern of magnetization (magnetic charge). For this pattern, the GMR element signal S(x,y) is measured as a function of x and y. Then equation (10) can be interpreted as an integral equation in which S(x,y) and $\sigma_m(x', y')$ are known, while R(x–x',y–y') is unknown. By solving this integral equation, the response function can be determined.

Having determined the response function, equation (10) can be viewed as a convolution integral equation that relates the raw, ISI-ridden image S(x,y) to the distribution of virtual, ISI-free magnetic charges $\sigma_m(x', y')$. This integral equation can be solved by using a two-dimensional Fourier transform, $$\tilde{f}(k_x, k_y) = \int \int_{-\infty}^{\infty} f(x, y) e^{-i(k_x x + k_y y)} dx dy \quad (11)$$

The solution can be written as follows:

$$\tilde{\sigma}_m(k_x, k_y) = \frac{\tilde{S}(k_x, k_y)}{\tilde{R}(k_x, k_y)} \quad (12)$$

Having found $\tilde{\sigma}_m$, the Fourier transforms of $M_x$ and $M_y$ can be determined. Here, we shall use the known fact that only the curl-free component of magnetization can be retrieved from GMR measurements. This is because the curl-free component of magnetization distribution is the field producing part of the total magnetization distribution. For this reason, only this component is sensed by the GMR element. Thus, $M_x$ and $M_y$ in equation (9) are meant to satisfy the additional equation $$curl_z M = \frac{\partial M_y}{\partial x} - \frac{\partial M_x}{\partial y} = 0 \quad (13)$$

By Fourier transforming equations (9) and (13), one can derive the following simultaneous equations for $\tilde{M}_x$ and $\tilde{M}_y$:

$$i(k_x \tilde{M}_x + k_y \tilde{M}_y) = -\frac{\tilde{\sigma}_m}{\mu_0 h} \quad (14)$$

$$k_y \tilde{M}_x - k_x \tilde{M}_y = 0 \quad (15)$$

By solving equations (14) and (15), the following equations are readily derived:

$$\tilde{M}_x(x, y) = \frac{i\tilde{\sigma}_m(k_x, k_y)k_x}{\mu_0 h(k_x^2 + k_y^2)} \quad (16)$$

$$\tilde{M}_y(x, y) = \frac{i\tilde{\sigma}_m(k_x, k_y)k_y}{\mu_0 h(k_x^2 + k_y^2)} \quad (17)$$

By performing the inverse Fourier transforms on equations (16) and (17), and by using equation (12), we arrive at the following explicit formulas for the actual ISI-free distributions of $M_x$ and $M_y$:

$$M_x = FT^{-1} \left[ \frac{i\tilde{S}(k_x, k_y)k_x}{\mu_0 h \tilde{R}(k_x, k_y)(k_x^2 + k_y^2)} \right] \quad (18)$$

$$M_y = FT^{-1} \left[ \frac{i\tilde{S}(k_x, k_y)k_y}{\mu_0 h \tilde{R}(k_x, k_y)(k_x^2 + k_y^2)} \right] \quad (19)$$

While the recovery of ordinary data on the track center is a 1-D ISI-removal problem, that of overwritten data is intrinsically a 2-D ISI-removal issue. It is expected that no recovery of such overwritten data is possible on the readback signal alone, which is severely distorted by 2-D ISI. In view of formulas (18) and (19) described above, it is indeed possible to recover such overwritten data through the current recovery technique. In addition, the industry practice of write-wide-read-narrow also makes possible the recovery of overwritten data. This is the practice where the write head writes a track wider than the read head senses. User data is especially susceptible to recovery if newer generation heads that have narrower read widths are used to read hard disk data recorded with older technologies.

The issues of numerical noise from the computation of the reconstructed images are addressed here. By examining formula (8) for the 1-D case and formulas (18) and (19) for the 2-D case, it is clear in the event that the denominators are zero, the numerators have to be forced to zero as well to prevent singularities. For the 1-D case, for example, if $k_x$ is zero, then $\tilde{S}(0)$ has to be zero. Specifically, from equation (4), the following condition must be satisfied when $k_x$ is zero:

$$\tilde{S}(0) = \int_{-\infty}^{\infty} S(x)dx = 0 \tag{20}$$

In other words, the raw ISI-distorted signal must have a zero mean over the length of consideration. Similarly, for the 2-D case, if both $k_x$ and $k_y$ are zero, then $\tilde{S}(0,0)$ has to be zero as well. From equation (11), the following condition is required:

$$\tilde{S}(0,0) = \int\int_{-\infty}^{\infty} S(x,y)dxdy = 0 \tag{21}$$

That is, the raw ISI-distorted image must have a zero mean over the region of consideration.

Apart from the issue of singularity, there are two other potential sources of numerical errors. First, small values of $\tilde{R}(k_x)$ in equation (8) and $\tilde{R}(k_x,k_y)$ in equations (18) and (19) might amplify the noise level. Second, since differentiation of the reconstructed magnetization is needed in order to obtain the readback signal, changes in magnetization might create undesirable noise after differentiation. Due to the above reasons, some special scheme is required to suppress and remove the noise.

To this end, it has been demonstrated that the numerical noise can be eliminated by suitably exploiting the properties of the arctangent function. The most salient properties of the arctangent function are that (1) it accentuates its argument when there is a change in polarity (switching) in the argument; and (2) it de-emphasizes the changes in the amplitude of its argument when these changes occur outside the switching region. Therefore, the arctangent function is a natural and extremely effective tool to suppress any numerical noise in the computation of the reconstructed images. It is a natural choice because magnetization patterns themselves are often modeled by arctangent transition.

Specifically, noise can be significantly removed if, instead of differentiating the magnetization directly, the arctangent of the magnetization is differentiated. In this way, the level of noise removal can also be controlled by multiplying the amplitudes of the magnetization by a scalable number. The equation below describes the arctangent operation:

$$S_{recovered}(x) = \frac{d}{dx}[\arctan(\alpha M(x))] \tag{22}$$

where $\alpha$ is a scalable factor that controls the level of noise reduction.

As an illustration, FIGS. 6A–6D show the effect of the arctangent operation in reducing the noise level of the recovered readback signal of tribit patterns. Here, the dashed lines in each figure represent the same raw ISI-distorted patterns while the solid lines are the recovered patterns. In the figures, the values of $\alpha$ go from one in FIG. 6A to some optimum value in FIG. 6D. As is evident, the arctangent operation has effectively suppressed the noise in the reconstructed readback signals.

It is known in the art that the scaling of the head response function can greatly improve the accuracy of the reconstructed magnetization. Here, in the case of ISI-removal, similar improvement in the recovered readback signal has also been demonstrated. FIGS. 7A–7D presents the improvement in the accuracy of the recovered tribit signals as one scales down the 1-D head response function (the dashed and solid lines assume their usual meanings). When no scaling is performed (FIG. 7A), the two peaks at locations 1.2 μm and 1.27 μm cannot be resolved. However, as one gradually scales down the head response function (from FIGS. 7B to 7D), all the peaks of the tribit patterns are eventually recovered.

Figure 8A:
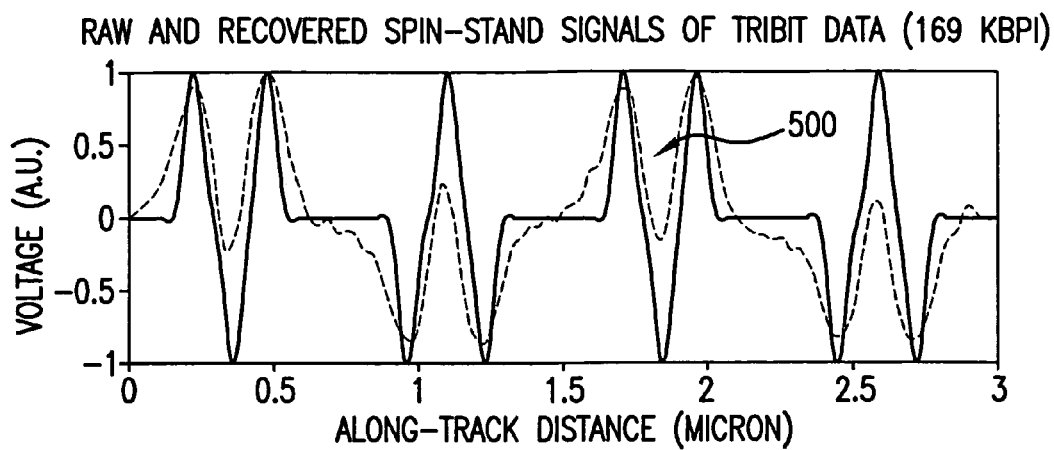
FIGS. 8A–8C graphically portray raw and recovered tribit patterns for varying linear densities.
Figure 8B:
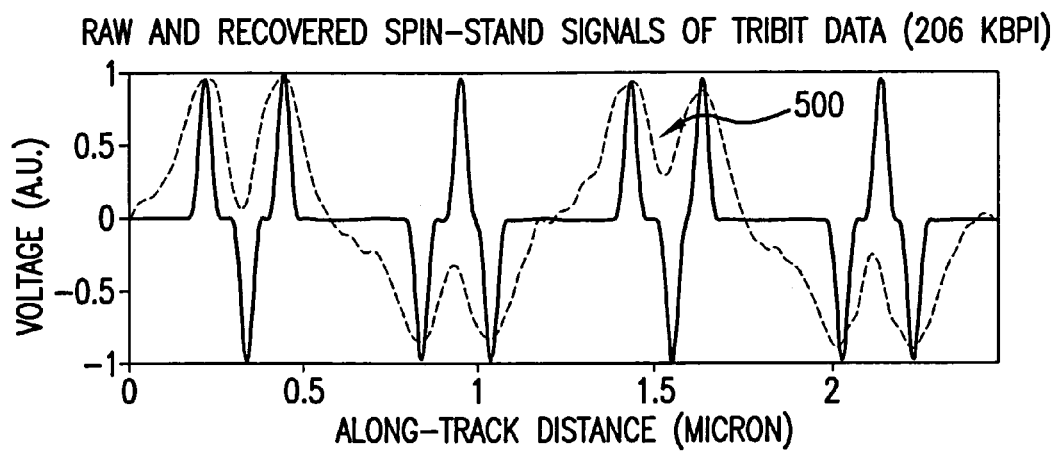
Figure 8C:
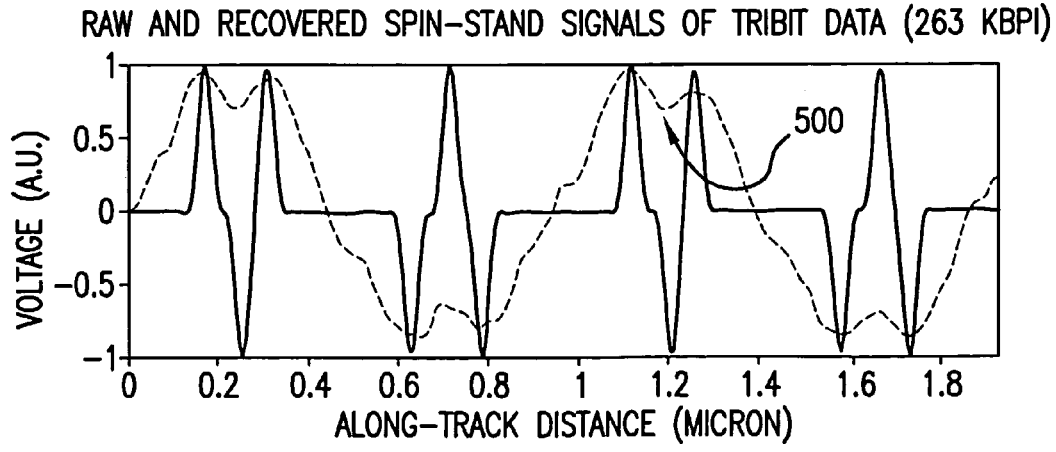

Referring now to FIGS. 8A–8C, there is graphically shown data from tribit patterns with known ISI in the readback signals which were written onto a hard disk. A tribit pattern is one that has three consecutive transitions. In the presence of ISI, the middle transition (generally indicated at 500) in the readback signal will be increasingly corrupted as the data density increases. FIGS. 8A–8C show the reconstructed readback signals (solid lines) superimposed on the ISI-distorted readback signals (dashed lines) of tribit patterns with increasing densities (from FIGS. 8A to 8C). The reconstructed readback signals were obtained through the use of the method of the present invention. It is clear that the middle transitions of the tribit patterns, which are not legible due to varying degrees of ISI, have been successfully reconstructed utilizing the subject technique.

Figure 9A:
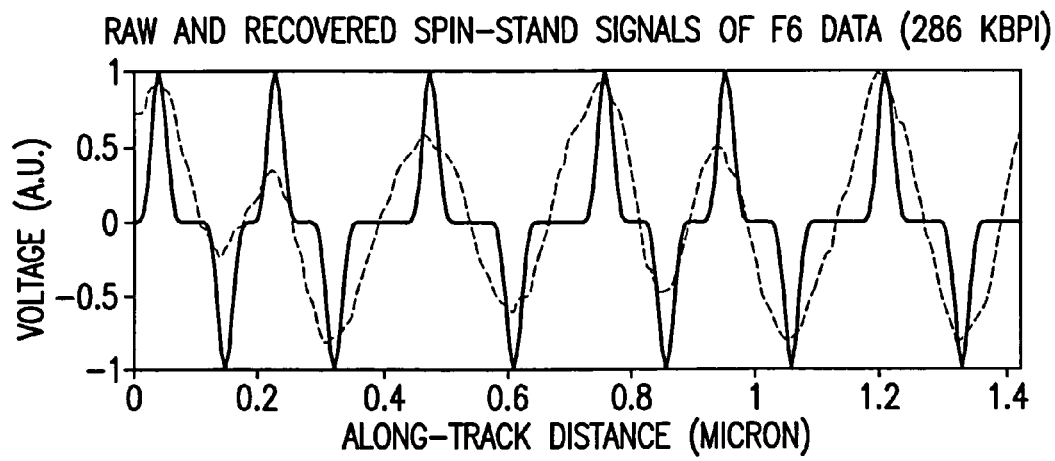
FIGS. 9A–9C graphically portray raw and recovered F6 patterns for varying linear data densities.
Figure 9B:
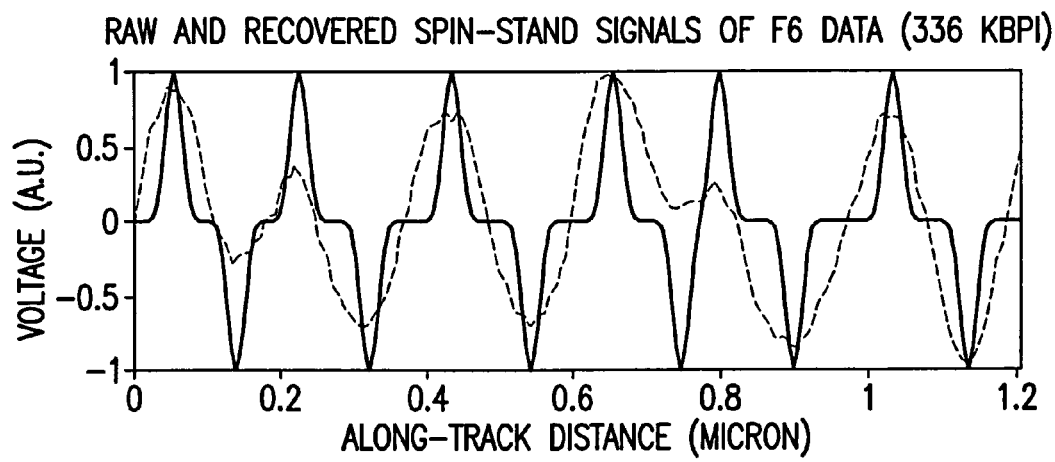
Figure 9C:
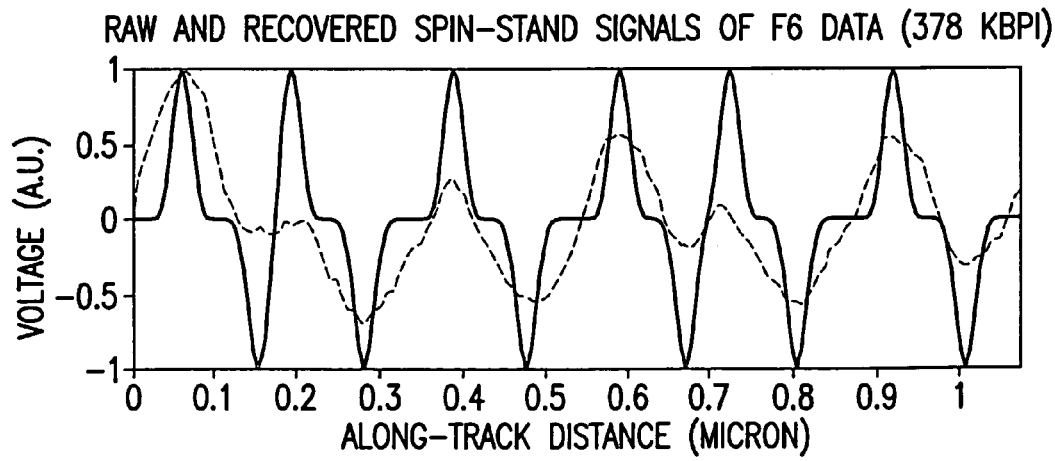

FIGS. 9A–9C show similar results, where the data originally written correspond to hexadecimal F6 patterns (i.e., binary pattern of "11110110") were written with increasing data density. The Figures show two periods of the reconstructed readback signals (solid lines) superimposed on the ISI-distorted readback signals (dashed lines) of the F6 patterns. As is clearly shown, the special signatures associated with the F6 patterns have been recovered after the ISI has been removed from the original raw readback F6 signals.

Figure 10:
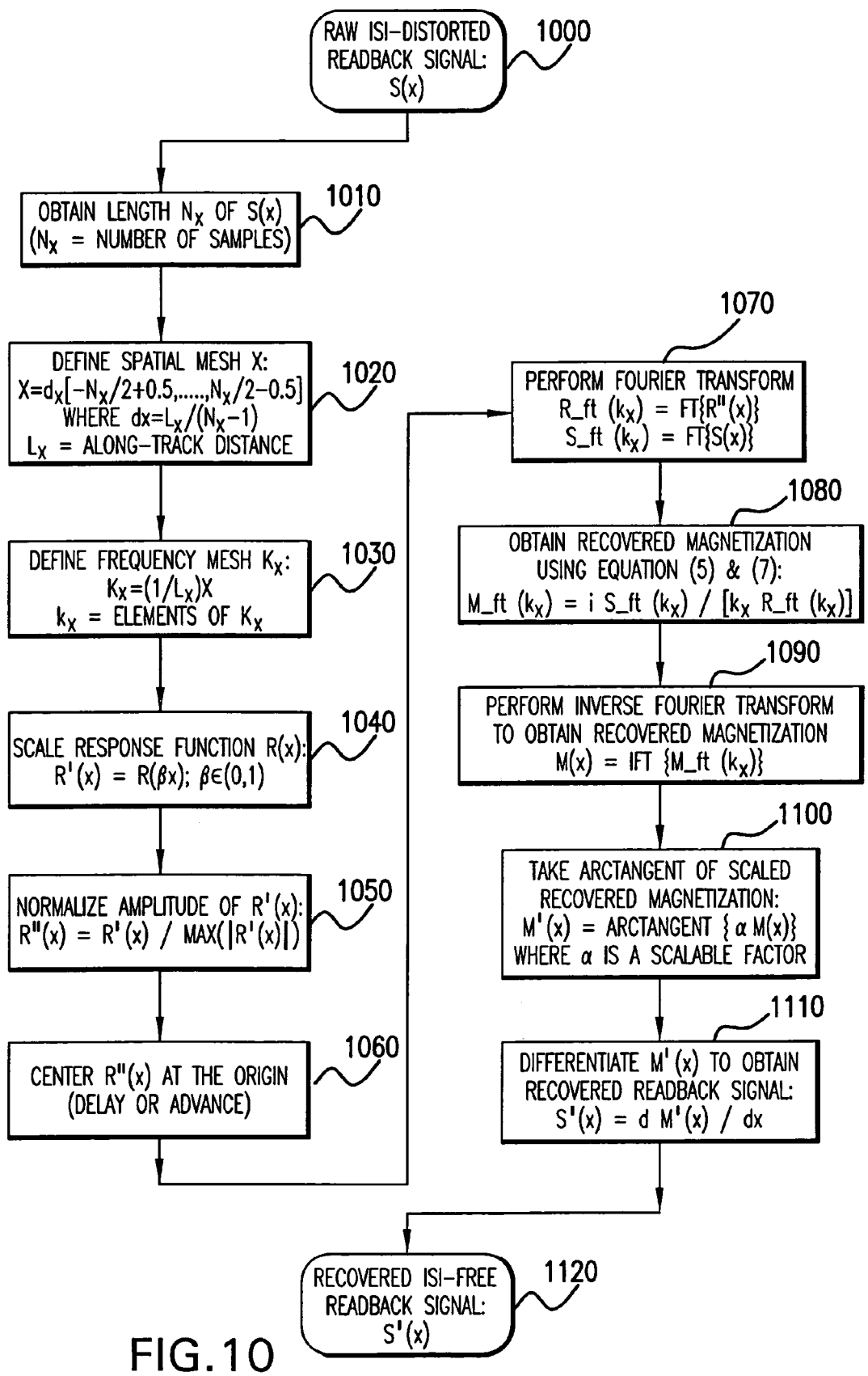
FIG. 10 is a flow chart of the one-dimensional case of the method of the present invention.

FIG. 10 is a flow chart of the process steps of an exemplary embodiment of the method of the present invention. First, as is indicated at block 1000, the raw ISI-distorted readback signal S(x) is acquired from the spin-stand imaging system of FIG. 1. From the readback signal S(x), the length of the signal, $N_x$, is determined, where $N_x$ is the number of samples taken of signal S(x). Next, as shown at block 1020, a spatial mesh X is defined as:

$$X = dx[-N_x/2+0.5, \ldots, N_x/2-0.5]$$

where $dx=L_x/(N_x-1)$ and $L_x$ is the along-track distance over which the readback signal S(x) has been acquired.

As is shown in block 1030, a similar mesh is defined for the frequency domain, where the frequency mesh is designated $K_x$. $K_x$ is defined as:

$$K_x = (1/L_x)X,$$

$k_x$ are the elements of $K_x$.

For the exemplary embodiment of the subject method of FIG. 10, it is assumed that the magnetoresistive transducer response function R(x) has been determined in accordance with the procedures outlined hereinabove. Then, as is shown at block 1040, the response function R(x) is scaled according to $$R'(x)=R(\beta x); \beta \in (0,1).$$

The scaled response function R'(x) is then normalized in amplitude according to $$R''(x)=R'(x)/\max(|R'(x)|)$$

as is shown at block 1050. At block 1060, the normalized response function R''(x) is centered at the origin by either delaying or advancing in space the response function R''(x).

When the raw data has been acquired, and the response function scaled, normalized and centered, flow is transferred to block 1070 where the Fourier transform of R''(x) and S(x) is performed to produce R_ft($k_x$) and S_ft($k_x$), respectively. Then, as is indicated at block 1080, the Fourier Transform of the recovered magnetization is obtained from the scaled and rotated ratio of Fourier transform S_ft($k_x$) and R_ft($k_x$) according to the equation:

$$M\_ft(k_x) = \frac{iS\_ft(k_x)}{k_x R\_ft(k_x)}$$

The recovered magnetization in the spatial domain is then obtained by taking the inverse Fourier transform of M_ft($k_x$) as shown at block 1090.

When recovered magnetization M(x) has been obtained, a noise reduction technique such as the application of the arctangent function as discussed hereinabove, is applied to produce $$M'(x)=\arctan(\alpha M(x)),$$

where α is a user-scalable factor. The noise reduced signal M'(x) is differentiated to produce the recovered ISI-free readback signal according to:

$$S'(x) = \frac{d}{dx} M'(x)$$

as shown at block 1110. The ISI-free readback signal as recovered by the method of the present invention is then output as S'(x) as shown at block 1120.

Figure 11:
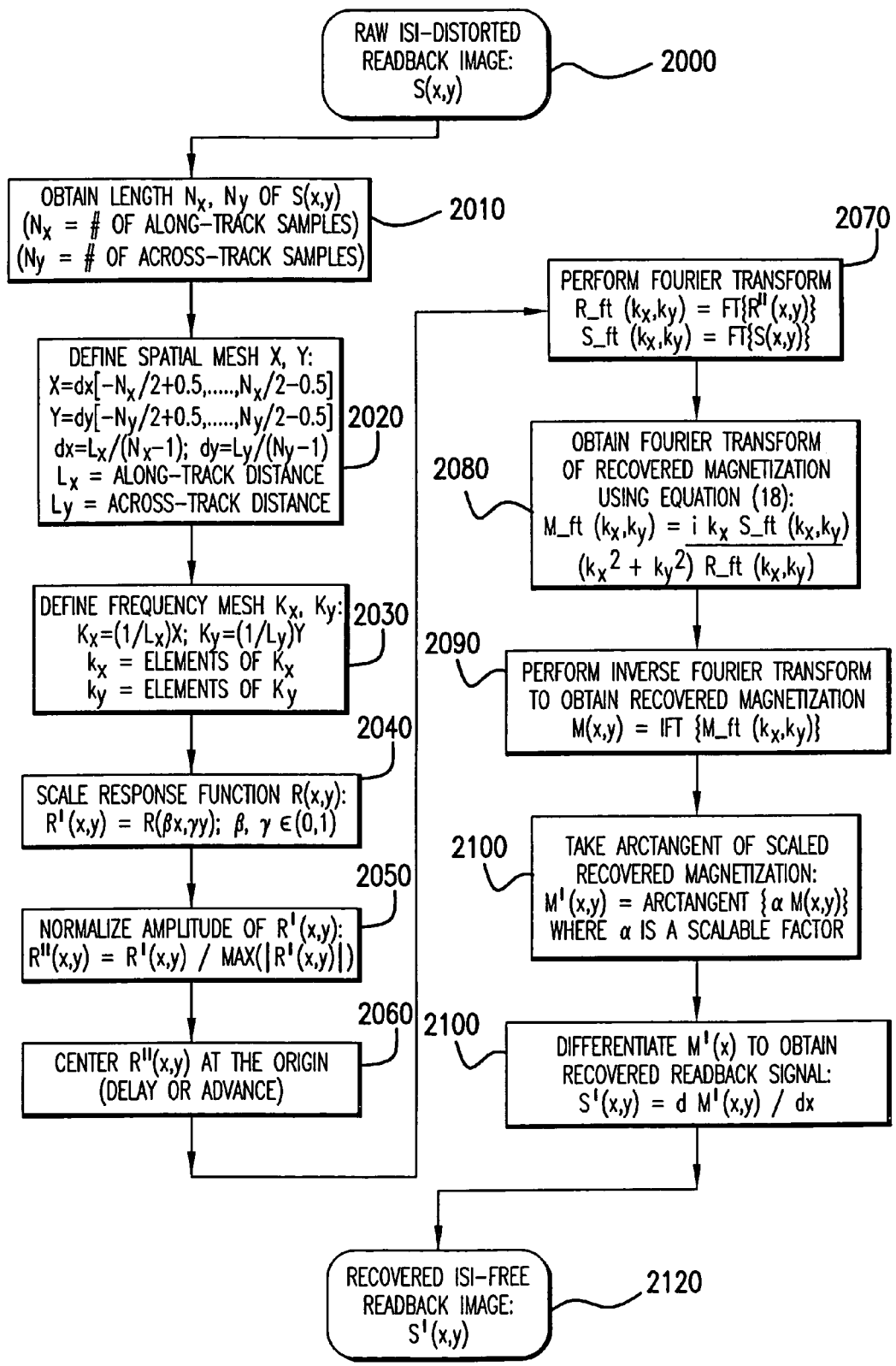
FIG. 11 is a flow chart of the two-dimensional case of the method of the present invention.

FIG. 11 is a flow chart of the process steps of the two-dimensional version of the method of the present invention. The process steps are self-explanatory in view of the previous discussion of FIG. 10 with the obvious extension to the two-dimensional case. The process steps 2000–2120 are basically identical to process steps 1000–1120, respectively, with the exception that the former set of process steps take into account the across-track variations as previously discussed.

Although the invention has been described herein in conjunction with specific embodiments thereof, many alternatives, modifications and variations will be apparent to those skilled in the art. The present invention is intended to embrace all such alternatives, modifications, and variations that fall within the spirit and broad scope of the appended claims.

What is claimed is:

1. A method for retrieving a signal corresponding to a distribution of magnetically polarized regions on a carrier of magnetically coated media by means of a magnetoresistive transducer coupled to a read channel circuit, the retrieved signal being free from intersymbol interference, the method comprising the steps of:
   (a). providing magnetoresistive transducer positioning means for positioning the magnetoresistive transducer to a user-selectable location over the carrier of magnetically coated media, said positioning means including drive means for producing a change in magnetic flux about the magnetoresistive transducer upon positioning thereof at said user-selectable location, said change in magnetic flux corresponding to the magnetically polarized regions on the carrier of magnetically coated media so as to produce a voltage at an output of the read channel circuit responsive thereto;
   (b). constructing a spatial image of a response function of the magnetoresistive transducer by measuring said voltage signal at said output of the read channel circuit responsive to a known distribution of the magnetically polarized regions disposed on a first carrier of magnetically coated media;
   (c). constructing a spatial image of raw read signal data by measuring said voltage signal at said output of said read channel circuit responsive to an unknown distribution of the magnetically polarized regions disposed on a second carrier of the magnetic media;
   (d). constructing a spatial image of a distribution of virtual magnetic charge corresponding to said unknown distribution of the magnetically polarized regions on said second carrier of magnetically coated media by spatial deconvolution of said spatial image of said response function of the magnetoresistive transducer and said spatial image of said raw read signal data; and
   (e). obtaining the retrieved intersymbol interference-free signal by spatially differentiating said spatial image of said distribution of virtual magnetic charge.

2. The method for retrieving a signal corresponding to a distribution of magnetically polarized regions on a carrier of magnetically coated media as recited in claim 1, wherein said magnetoresistive transducer positioning means providing step (a) includes the step of configuring said drive means to provide relative motion between the magnetoresistive transducer and the carrier of magnetically coated media upon positioning the magnetoresistive transducer at said user-selectable location.

3. The method for retrieving a signal corresponding to a distribution of magnetically polarized regions on a carrier of magnetically coated media as recited in claim 1, further including the step of applying a noise-reduction function to said spatial image of a distribution of virtual magnetic charge prior to said differentiating step (e).

4. The method for retrieving a signal corresponding to a distribution of magnetically polarized regions on a carrier of magnetically coated media as recited in claim 3, wherein said noise reduction function includes the step of applying an arctangent function to said spatial image of a distribution of virtual magnetic charge.

5. The method for retrieving a signal corresponding to a distribution of magnetically polarized regions on a carrier of magnetically coated media as recited in claim 4 further including the step of scaling said spatial image of a distribution of virtual magnetic charge by a predetermined scaling factor prior to applying said arctangent function.

6. The method for retrieving a signal corresponding to a distribution of magnetically polarized regions on a carrier of magnetically coated media as recited in claim 1, wherein said response function image constructing step (b) includes the steps of:

writing a thin stripe of the magnetically polarized regions as said known distribution on said first carrier of magnetically coated media;

measuring said voltage signal at each of a predetermined number of locations relative to said thin stripe;

partitioning said response function image into a plurality of data points, said plurality of data points corresponding in number to said predetermined number of locations at which said voltage signal is measured; and assigning said voltage signal measurement for each of said predetermined number of locations to said respective one of said plurality of data points in said response function image.

7. The method for retrieving a signal corresponding to a distribution of magnetically polarized regions on a carrier of magnetically coated media as recited in claim 1, wherein said response function image constructing step (b) includes the steps of:

writing a spot of the magnetically polarized regions as said known distribution on said first carrier of magnetically coated media;

measuring said voltage signal at a each of a predetermined number of locations relative to said spot;

partitioning said response function image into a plurality of data points, said plurality of data points corresponding in number to said predetermined number of locations at which said voltage signal is measured; and assigning said voltage signal measurement for each of said predetermined number of locations to said respective one of said plurality of data points in said response function image.

8. The method for retrieving a signal corresponding to a distribution of magnetically polarized regions on a carrier of magnetically coated media as recited in claim 7, wherein said spot writing step includes the steps of:

writing a thin stripe of the magnetically polarized regions on said first carrier; and erasing a predetermined amount of said thin stripe using DC erasure so as to magnetically isolate said spot.

9. The method for retrieving a signal corresponding to a distribution of magnetically polarized regions on a carrier of magnetically coated media as recited in claim 1, wherein said raw read signal data image constructing step (b) includes the steps of:

measuring said voltage signal at each of a predetermined number of locations;

partitioning said raw read signal data image into a plurality of data points, said plurality of data points corresponding in number to said predetermined number of locations at which said voltage signal is measured; and assigning said voltage signal measurement for each of said predetermined number of locations to said respective one of said plurality of data points in said raw read signal data image.

10. The method for retrieving a signal corresponding to a distribution of magnetically polarized regions on a carrier of magnetically coated media as recited in claim 1, wherein said deconvolution of said spatial image of said response function of the magnetoresistive transducer and said spatial image of said raw read signal data in said virtual magnetic charge distribution image constructing step (d) includes the steps of:

transforming said image of said response function and said image of said raw read signal data to spatial frequency representations thereof by a first orthogonal transformation;

calculating a ratio image of said spatial frequency representation of said raw read signal data to said spatial frequency representation of said spatial image of said response function to produce a ratio image;

scaling and rotating said ratio image;

transforming said scaled and rotated ratio image to a spatial coordinate representation thereof by a second orthogonal transformation to produce said virtual magnetic charge distribution image, said second orthogonal transformation being an inverse operation of said first orthogonal transformation.

11. The method for retrieving a signal corresponding to a distribution of magnetically polarized regions on a carrier of magnetically coated media as recited in claim 10, wherein said first orthogonal transformation is a Fourier transform.

12. The method for retrieving a signal corresponding to a distribution of magnetically polarized regions on a carrier of magnetically coated media as recited in claim 1, wherein said spatial image of said response function is a one-dimensional image.

13. The method for retrieving a signal corresponding to a distribution of magnetically polarized regions on a carrier of magnetically coated media as recited in claim 12, wherein said raw read signal data image constructing step (c) includes the steps of:

determining a position for the magnetoresistive transducer at which said voltage at said output of said read channel signal is at a local maximum;

positioning the magnetoresistive transducer to said position at which said voltage is at a local maximum; and measuring said voltage at said position to construct said spatial image of said raw read signal data image.

14. The method for retrieving a signal corresponding to a distribution of magnetically polarized regions on a carrier of magnetically coated media as recited in claim 1, wherein said spatial image of said response function is a two-dimensional image.

15. The method for retrieving a signal corresponding to a distribution of magnetically polarized regions on a carrier of magnetically coated media as recited in claim 1 including the step of forming the carrier of magnetically coated media into a hard disk.

16. The method for retrieving a signal corresponding to a distribution of magnetically polarized regions on a carrier of magnetically coated media as recited in claim 15, wherein said positioning means providing step (a) includes the steps of:

providing a spindle motor as said drive means; and mounting said hard disk onto said spindle motor so as to rotate said hard disk thereon.

17. A method for retrieving previously written data from a magnetically coated disk by means of a magnetoresistive transducer coupled to a read channel circuit, the read channel producing at an output thereof a voltage signal corresponding to a change in magnetic polarity at the magnetoresistive transducer, the method comprising the steps of:

providing positioning means for positioning the magnetoresistive transducer to a user-selectable location over the magnetically coated disk, said positioning means including a spindle motor for rotating the magnetically coated disk relative to said user-selectable location upon positioning the magnetoresistive transducer thereat so as to produce the change in magnetic polarity;

acquiring the voltage signal at the output of the read channel circuit responsive to a known pattern of magnetized regions on a magnetically coated disk in the rotation relative to said user-selectable location;

repeating the voltage signal acquiring step until a spatial image of a response function of the magnetoresistive transducer is formed;

acquiring the voltage signal at the output of the read channel circuit responsive to an unknown pattern of magnetized regions on a magnetically coated disk in the rotation relative to said user-selectable location;

repeating the voltage signal acquiring step until a spatial image of a raw read signal is formed;

providing signal processing means for recovering the signal corresponding to a distribution of magnetically polarized regions from said spatial image of said response function and said spatial image of said raw read signal, said signal processing means including storage means for storing executable program code and representations of said spatial image of said response function and said spatial image of said raw read signal, said executable code including the steps of:

calculating a frequency-domain representation of said response function image;

storing said frequency-domain representation of said response function image as a response function spatial frequency spectrum;

calculating a frequency-domain representation of said raw read signal image;

storing said frequency-domain representation of said raw read signal image as a read signal spatial frequency spectrum;

transforming into a virtual magnetic charge spatial image a scaled ratio of said read signal spatial frequency spectrum to said response function spatial frequency spectrum; and differentiating said virtual magnetic charge spatial image to produce the previously written data.

18. The method for retrieving previously written data from a magnetically coated disk as recited in claim 17, wherein said executable program code further includes the step of applying a noise reduction function to said virtual magnetic charge spatial image prior to said differentiating step.

19. The method for retrieving previously written data from a magnetically coated disk as recited in claim 18, where said noise reduction function applying step includes the steps of:

scaling said virtual magnetic charge spatial image by a predetermined number; and applying an arctangent function to said scaled virtual magnetic charge spatial image.

20. The method for retrieving previously written data from a magnetically coated disk as recited in claim 17, wherein said known pattern of magnetization regions is a thin stripe disposed on the magnetically coated disk.

21. The method for retrieving previously written data from a magnetically coated disk as recited in claim 17, wherein said known pattern of magnetization regions is a magnetically isolated spot disposed on the magnetically coated disk.

* * * * *